(12) United States Patent
Ulzheimer

(10) Patent No.: US 7,960,449 B2
(45) Date of Patent: Jun. 14, 2011

(54) PROCESS FOR MAKING FILLED SILICONE RUBBER COMPOSITIONS

(75) Inventor: Rudi Ulzheimer, Idstein (DE)

(73) Assignee: Dow Corning Corporation, Midland, MI (US)

( * ) Notice: Subject to any disclaimer, the term of this patent is extended or adjusted under 35 U.S.C. 154(b) by 989 days.

(21) Appl. No.: 10/589,446

(22) PCT Filed: Feb. 10, 2005

(86) PCT No.: PCT/GB2005/000460
§ 371 (c)(1),
(2), (4) Date: Jul. 6, 2007

(87) PCT Pub. No.: WO2005/077509
PCT Pub. Date: Aug. 25, 2005

(65) Prior Publication Data
US 2007/0282036 A1    Dec. 6, 2007

(30) Foreign Application Priority Data
Feb. 11, 2004 (GB) .................................. 0402972.4

(51) Int. Cl.
C08K 9/06 (2006.01)
(52) U.S. Cl. ......... 523/212; 366/288; 524/492; 524/493
(58) Field of Classification Search .................. 523/212; 524/492, 493; 366/288
See application file for complete search history.

(56) References Cited

U.S. PATENT DOCUMENTS

| | | | |
|---|---|---|---|
| 4,337,000 A | 6/1982 | Lehmann | |
| 5,150,968 A | 9/1992 | Inoue | |
| 5,700,853 A * | 12/1997 | Yoshida et al. | 523/212 |
| 6,124,392 A | 9/2000 | Heisler et al. | |
| 6,177,506 B1 | 1/2001 | Takahashi et al. | |
| 6,652,137 B1 * | 11/2003 | Bosch et al. | 366/288 |

FOREIGN PATENT DOCUMENTS

| | | |
|---|---|---|
| DE | 10024493 | 6/2002 |
| GB | 761614 | 11/1956 |
| JP | 59-19528 A | 2/1984 |
| JP | 02-28725 A | 2/1990 |
| JP | 06-503048 A | 4/1994 |
| JP | 09-277348 A | 10/1997 |
| JP | 2001-315117 A | 11/2001 |
| JP | 2004-033813 A | 2/2004 |
| SU | 929186 | 5/1982 |
| WO | W003024691 A1 | 3/2003 |
| WO | W02004010786 A1 | 2/2004 |

OTHER PUBLICATIONS

English language abstract for DE10024493 extracted from espacenet.com Sep. 15, 2006.
English language Derwent Abstract for SU929186.
English language abstract for JP 59-19528 extracted from espacenet.com database Feb. 18, 2011, 5 pages.
Japanese Patent No. JP 02-28725 extracted from PAJ database Feb. 18, 2011, no English translation available, 4 pages.
English equivalent abstract for JP 06-503048 extracted from espacenet.com database Feb. 18, 2011, 10 pages.
English language translation and abstract for JP 09-277348 extracted from PAJ database Feb. 18, 2011, 26 pages.
English language translation and abstract for JP 2001-315117 extracted from PAJ database Feb. 18, 2011, 69 pages.
English language translation and abstract for JP 2004-033813 extracted from PAJ database Feb. 18, 2011, 51 pages.

* cited by examiner

Primary Examiner — Edward J Cain
(74) Attorney, Agent, or Firm — Howard & Howard Attorneys PLLC

(57) ABSTRACT

A process for the production of a polysiloxane containing mass incorporating surface treated filler materials comprising feeding materials to a change can mixer in which the materials are mixed; the change can mixer comprising a detachable mixing head assembly containing least two spiral mixing arms extending downwardly into the can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed.

39 Claims, 2 Drawing Sheets

PROCESS FOR MAKING FILLED SILICONE RUBBER COMPOSITIONS

RELATED APPLICATIONS

This application claims priority to and all the advantages of International Patent Application No. PCT/GB2005/000460, filed on Feb. 10, 2005, which claims priority to Great Britain Patent Application No. GB 0402972.4, filed on Feb. 11, 2004.

This invention is related to a batch process for making heat vulcanizing silicone rubber compositions including Room Temperature Vulcanizing (RTV) silicone rubbers such as Mold Making (MM) silicone rubbers, ie, addition cure/platinum cure; and High Temperature Vulcanizing (HTV) silicone rubbers such as High Consistency Rubber (HCR) and Liquid Silicone Rubber (LSR). Such silicone rubber compositions contain a filler such as silica which requires in-situ treatment to generate compatability with the polysiloxane used in the silicone rubber composition.

Silicone rubber compositions that can be applied or shaped in fluid condition and then cured are well known. Among such compositions are those that are intended to have a low viscosity during storage and application and yet provide products of high mechanical strength. Such silicone rubber compositions may be used for a variety of purposes, and are especially favoured for use in coating or molding operations in which they become cured, with or without a separate heating operation. Typically, such silicone rubber compositions contain a reinforcing filler, the most commonly used one being silica, in order to enhance the mechanical properties of cured products.

It has become a practice to render reinforcing fillers, such as silica, hydrophobic by suitable treatment of the fillers surface. Surface treatment of fillers such as silica can be done with the silica in dry powder form and before introduction to the silicone rubber composition, but is commonly done in-situ in the composition. Surface treating materials (henceforth referred to as hydrophobing agents) such as hexamethyldisilazane (HMDZ), hexamethyldisiloxane (HMDO), and divinyltetramethyldisilazane, are therefore usually incorporated into the polysiloxane and silica composition either alone or optionally with water Silicone rubber compositions are typically prepared by mixing substantially linear high molecular weight polysiloxanes with the treated filler and other desired additives to form a base or raw stock. Prior to use, the base is compounded to incorporate a crosslinking agent, other fillers, and additives such as pigments, anti-adhesive agents, plasticizers, and adhesion promoters. The resulting composition can then be vulcanised by press vulcanisation or continuously by extrusion, i.e., injection and transfer molding, to form the final silicone rubber product. For example, cable insulation is extruded by special techniques in which the silicone rubber is applied to cable cores by means of angular extruder heads. Another common application of such compositions is the treatment of textile fabrics.

The mixing of Silicone rubber compositions to form a base or raw stock may be carried out in any suitable mixer. Mixers of various types have been proposed but the viscosity of the resulting mixtures prevent many batch type mixers from use for this purpose because whilst assisting in reinforcing the final product, fillers such as silica also tend to associate progressively with the polysiloxanes present in the fluid composition, with the result that a corresponding increase in viscosity of the silicone rubber composition is obtained. The increase in viscosity often has a detrimental effect on the homogeneous intermixing of the silicone rubber composition. For example a layer of polymer may adhere to the mixer walls and remain unmixed because there is always a gap between the edge of the mixer arm and the mixer vessel wall (of about 0.5 to 1 cm). When present the resulting layer provides the added problem that it substantially insulates the mixer, thereby preventing the release of heat through the mixer walls resulting in the mixture being subjected to unnecessarily high temperatures during the mixing process. Another prior art problem associated with the increase of viscosity, as the proportion of filler in the composition increases, is the fact that because of the geometries of the mixing arms, which direct materials in an upwardly direction, the composition being mixed may gradually move above the mixing arms and avoid the mixing process resulting in unmixed end-products or unevenly mixed products. Highly viscous materials may also form into a "lump", which if mixing tool configuration allows, avoids the mixing tools resulting in the mixer turning without mixing and/or shearing the material.

There are several other significant problems in the mixing silicone rubber compositions, not least is the fact that a very high power is required in the mixer to drive the mixing arm(s) or the like, typically an industry standard is in the region of at least 0.2 kW per liter, typically being between 0.3 to 0.7 kW per liter of material being mixed is required to ensure the functioning of the mixer. This equates to the need for silicone rubber mixers to be about 10 times more powerful than average kitchen/bread type mixers. Furthermore, mixers suitable for mixing silicone rubber compositions need to withstand temperatures of up to about 250° C. which are generated due to shear in the mixing vessel. Because of the temperatures generated due to shear it will also be appreciated that typically no heating apparatus is required to aid the mixing, indeed a cooling system is more likely to be used in the case of mixer units for silicone rubber compositions. Another requirement for silicone mixers is that the internal mixing vessel needs to have no potential ignition sources due, in particular, to the flammability of the hydrophobing agent. For example (HMDZ has a flash point of about −22° C.

Hence it is to be appreciated that a large proportion of batch type mixers currently on the market are totally unsuitable for the purpose of mixing silicone rubber compositions, for example U.S. Pat. No. 4,337,000 describes a planetary type kitchen mixer designed for mixing bread dough. Whilst it comprises "anti-climb dough hooks" which may be suitable from bread mixing and the like it is clearly incapable of use for mixing compositions of the viscosities involved in mixing silicone rubber compositions or providing the necessary shear. GB761614 is the sort of mixer typically used for the manufacture of putty and like materials. Such mixers are not forced action mixers which means that material being mixed can quite easily escape the mixing action and thereby remain unmixed or unevenly mixed. In this case the mixer comprises a rotating vessel with fixed scraper blades and stationary rotating kneading rolls. SU929186 is a typical vertical powder mixer which can mix low viscosity fluids. The mixing vessel is an integrated part of the mixer. Material is typically dumped out the bottom outlet (free flow) before the next lot can be processed and has no ability to mix high viscous materials because the power intake and shear generated using this type of mixer is inadequate for processes involving silicone rubber compositions.

It has now been found that mixtures of polysiloxanes and reinforcing fillers can be prepared with improved efficiency by feeding selected materials to a change can mixer having two or more spiral mixing arms that rotate and turn in a planetary mode.

The invention is directed to a process for making a polysiloxane mass containing a surface treated filler by mixing the materials in a change can mixer of unique design. The change can mixer includes a detachable mixing head assembly containing at least two spiral mixing arms extending downwardly into the can of the change can mixer. A drive means rotates the spiral mixing arms around their own axis, and a drive means rotates the spiral mixing arms as a unit around the axis of the can. The spiral mixing arms are designed such that they generate downwardly directing motion on the composition being mixed. The materials mixed to form the mixture in the change can mixer include:

(i) a polysiloxane having at least 20 and preferably more than 40 siloxane units, which is selected from the group consisting of trialklysilyl end blocked polysiloxanes, and polysiloxanes having at least one silicon bonded alkenyl group, hydroxyl group, and/or hydrolysable group;

(ii) a reinforcing and/or non-reinforcing filler material comprising one or more of finely divided silica, surface treated finely divided silica, calcium carbonate, surface treated finely divided calcium carbonate, clays such as finely divided kaolin and/or surface treated finely divided kaolin quartz powder, aluminium hydroxide, zirconium silicate, diatomaceous earth, wollastonite, pyrophylate, and metal oxides such as titanium dioxide, cerium oxide and iron oxide; These may also include glass fibre, talc, aluminite, calcium sulphate (anhydrite), gypsum, calcium sulphate, magnesium carbonate, magnesium hydroxide (brucite), graphite, barite, a form of barium sulphate, copper carbonate, e.g. malachite, nickel carbonate, e.g. zarachite, barium carbonate, e.g. witherite and/or strontium carbonate e.g. strontianite. Most preferably the filler material comprises finely divided silica, surface treated finely divided silica; and where the filler is to be hydrophobically treated in situ (iii) an hydrophobing agent selected from the group consisting of disilazanes such as HMDZ and divinyltetramethyldisilazane, HMDO, polydiorganosiloxanes having 2-40 siloxane units having silicon bonded hydroxyl groups or amino groups and optionally alkenyl groups, for example a trimethylsilyl terminated polydimethylsiloxane having a viscosity of between 100 and 1000 cst (i.e. between 1 and $10 \times 10^{-4}$ $m^2s^{-1}$), preferably between 250 and 500 cst (i.e. between 2.5 and $5 \times 10^{-4}$ $m^2s^{-1}$) and/or alkoxysilanes.

Change can mixers are one of the many kinds of equipment used for blending viscous materials. In a change can mixer, one or more blades or mixing arms are designed to cover all regions of the can by a planetary and a rotational motion of the arms or by the rotation of the can. The mixer is generally designed so that the mixing arms can be raised and lowered into the can, or the can is raised and lowered about the mixing arms. In the present invention, the former is preferred. Such equipment typically includes a system in which separate cans can be used to allow ingredients to be measured carefully before the mixing operation begins and used to transport a finished batch to the next operation while the next batch is being mixed.

During the mixing operation, a central drive mechanism rotates each of the mixing arms around its own axis, while at the same time, the central drive mechanism is capable of rotating the entire system of mixing arms around the axis of the can, i.e., a planetary mode. In this fashion, all areas of the can are mixed and thoroughly blended, eliminating the so-called dead spots that normally occur in other types of mixing devices.

The change can mixers used in the process according to the present invention contain 2-5 spiral mixing arms extending downwardly into the can of the change can mixer; preferably 2-4 spiral mixing arms; most preferably three spiral mixing arms, spaced 120 degrees apart circumferentially, with respect to the centre line of the can of the change can mixer are used. The spiral mixing arms typically all have the same dimensions and 3-D shape. Each spiral mixing arms preferably comprises between 0.5 and 2 revolutions. The geometry of the mixing arms is such that they generate downwardly directing motion on the composition being mixed. This downwardly directing motion substantially prevents the problem of the lifting of the mixture above the arms which results in non-homogeneity in prior art mixers. This geometry also substantially avoids problems where the filler, typically dried silica, has been introduced into the mixer too quickly. In relation to the majority of prior art mixers this generally leads to a powder stage where the silica merely sits on top of the composition and is not homogeneously inter-mixed with the polymer. A central drive mechanism is preferably provided and adapted to supply independent speeds for providing the planetary movement of the assembly of spiral mixing arms, and for supplying rotational movement to the individual spiral mixing arms themselves.

Preferably the speed of each mixing arm is the same for each arm and is in the region of from 15 to 200 rpm. Any suitable gear ratio between the planetary and tool rotation may be used but preferably the gear ratio is between 2 and 10 most preferably between 3 and 6.

Since the highly viscous materials being mixed are constantly being pushed downwardly toward the bottom of the change can mixer by the spiral mixing arms, rather than accumulating around the mixing arms as in other types of mixers, much higher planetary speeds can be used in comparison to other mixer designs. This downward pushing movement of materials by the action of the spiral mixing arms also avoids the formation of gels, because of the resulting turnaround of the materials in the can. In comparison to other mixing devices known in the art, the unique mixer used herein can effectively mix highly viscous materials in cycle times reduced by as much as 50 percent, and in some cases even 80 percent.

Materials (i)-(iii) may be fed to the change can mixer individually, or as mixture containing two or more of the materials (i)-(iii). The finely divided filler is preferably a fumed silica or a precipitated silica. The product of the change can mixer will generally consist of a paste or powder. Water may also be included as one of the materials being mixed in the change can mixer. The mixture prepared in the change can mixer may be compounded with other materials such as curative agents, catalysts, inhibitors, plasticising agents, extending agents, and/or non-reinforcing fillers, to provide curable products. Typically the resulting mixture is either a polymer/filler masterbatch, a polymer, filler (e.g. silica) and catalyst mixture or a polymer, inhibitor, X-linker and filler mixture. In the case of making a two part composition, any combination is acceptable provided the catalyst, polymer and cross-linker are not all present in the same pre-cure mixture, i.e. typically some polymer and the catalyst will be present in one part and the remaining polymer and the cross-linker will be stored in the other part.

Preferably the process in accordance with the present invention contains the following steps:

(a) Mixing step—where the polymer, filler and (when treating the filler in-situ) hydrophobic treating agent are mixed together with the treating agent rendering the filler hydrophobic during mixing (i.e. the hydrophobing agent interacts with the filler in-situ). The polymer may alternatively be mixed with pretreated filler although this is not generally preferred;

(b) Stripping step—this step is particularly important in processes involving the in-situ treatment of filler as it is used to drive off volatiles such as for example residual treating agent and/or water from the mixture once the filler is considered sufficiently well coated, i.e. sufficiently hydrophobic. Preferably to accelerate the stripping step the change can mixer is provided with a vacuum means which when in use reduces the boiling point of the volatiles rendering their extraction easier. A gas purging means for purging the change can with an inert gas, typically nitrogen, to aid in driving off said volatiles and/or residual treating agent may also be provided;

(c) Dilution step—the addition of lower viscosity organopolysiloxane polymers to reduce the overall viscosity of the resulting mixture as discussed below.

Preferably the vacuum which may be applied will reduce the pressure in the mixing vessel to 150 mbar ($150\times10^2$ $Nm^{-2}$) or less. The purging means can be placed in any suitable position, in the mixer for example in the change can body or base or in the mixer head. In the case of the situation when the purging means introduction is through an entry formed in the body of the change can, preferably the change can comprises a receiver for receiving a flexible pipe or the like which in use provides the purging gas.

Preferably, during mixing the mixing chamber of the change can is maintained in an inert atmosphere, typically a nitrogen atmosphere. The temperature of the material being mixed is maintained under 100° C. during step (a), more preferably it is maintained at no greater than about 75° C. Once the filler has been successfully introduced and mixed into the polymer whilst also being rendered hydrophobic, the temperature of the material being mixed is allowed to increase, due to the effects of shear and in increase in viscosity of the composition, up to between 200 and 250° C. prior to and during step (b) to aid in the removal of volatiles and water and the like.

The dilution step (c) may take place at these elevated temperatures but either during or after step (c) a cooling means such as a cooling jacket may be utilised around or on the change can mixer to reduce the temperature within the mixing chamber to below about 130° C. This is necessary in cases where additives such as cross-linkers, catalysts and the like are to be added into the mixture as they need to be added below this temperature in order to function as required during curing in due course. The cooling means may also be used throughout the process to inhibit the temperature rise in the mixer caused by shear, which can be important in processes requiring extended mixing stages in order to prevent overheating of the mixture.

In step (c) after mixing, the resulting mixture may be diluted or "cut-back" by the addition of a lower viscosity siloxane polymer to reduce the viscosity of the product. Any suitable siloxane polymer may be utilized in said dilution process, e.g. high viscosity dimethylhydroxysilyl terminated polydimethylsiloxane. The mixer of the present invention has been found to be significantly faster than prior art mixers for homogeneously mixing silica into siloxane polymers.

The geometry of the mixing arms avoids the need for any substantial scraping tools being needed other than the non-metallic mixing arm tips which are a significant advantage over dissolver/planetary/wall scraper type mixers which have problems with rising mixtures and the formation of layers on the wall.

Another advantage of the present invention is that the change can may be perforated at the base with one or more holes. This enables the introduction of nitrogen through the perforations into the change can to strip out volatiles during and/or after mixing and additionally provides a means of "downsizing" the resulting mixed product by effectively extruding mixture resulting from a mixing process undertaken by the change can mixer from a single lump to a manageable size by forcing the resulting mixture through the perforation(s) in the base of the change can mixer using e.g. a suitable press, such as a pot press. Typically a dispatch rate of between 40 and 60 kg per min extrusion rate through one or more 5-10 cm diameter perforation(s) might be achieved, using a suitable press, such as a pot press. Extrusion through said perforation(s) being undertaken using a pot press or the like and applying sufficient pressure onto the resulting mixture to force it through the perforation(s) and into a suitable next stage apparatus.

The present invention further relates to the use of a change can mixer comprising a detachable mixing head assembly containing least two spiral mixing arms extending downwardly into the can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, as a batch mixer in a process for the production of a polysiloxane containing mass incorporating surface treated filler.

Any suitable silicone rubber mixtures may be prepared using the mixers of the present invention. For example 2-part mixes may be made in separate change can mixer units, e.g. one mixer may mix polymer, filler, optional hydrophobing agent and catalyst and a second mixer may prepare a second mixture comprising polymer cross-linker, filler and inhibitor or other additives. Alternatively the mixer may be utilized to make high consistency rubber master batches substantially comprising polymer and filler only.

These and other features of the invention will become apparent from a consideration of the detailed description.

Figure 3:
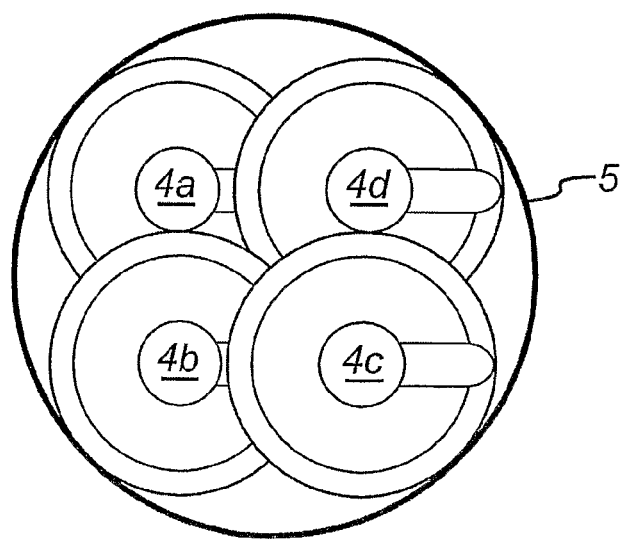

FIG. 3 is a functional representation and a cross-sectional top view of four spiral mixing arms arranged in the mixing can. During a mixing operation, a central drive mechanism may rotate each of the mixing arms around its own axis, while at the same time, the central drive mechanism rotates all four of the spiral mixing arms as a unit around the axis of the can, i.e., a planetary rotational mode. Alternatively the planetary mixing may be independent of mixing tool rotation through use of a two-drive mechanism. Providing four or less mixing arms are used, a separate scraper arm (not shown) may replace the fifth mixing arm. The scraper arm is used to wipe the wall of the pot using the planetary action.

The invention will become more apparent from a consideration of the following detailed description.

Figure 1:
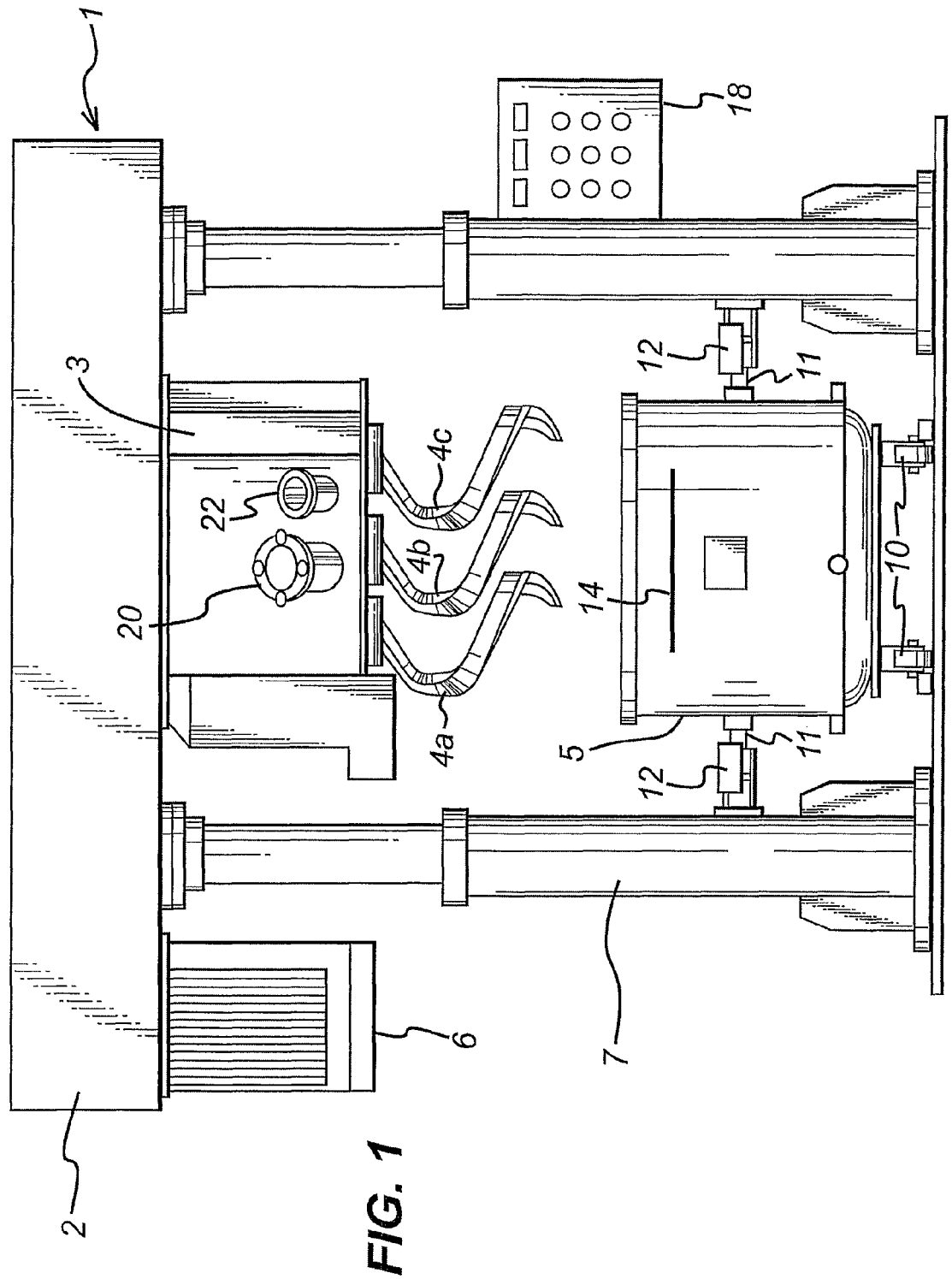
FIG. 1 is a pictorial representation and a front view of a change can mixer preferred for use according to the present invention.

Referring to FIG. 1 there is provided a change can mixer 1 having a central drive mechanism 2 to which a detachable mixing head 3 is attached. The detachable mixing head 3 houses four spiral mixing arms 4a, 4b 4c and 4d (of which only 4a, 4b and 4c are depicted in FIG. 1) for mixing ingredients in a change can 5. Detachable mixing head 3 can be raised and lowered into the change can by means of a hydraulic lifting system 7. The central drive mechanism 2 is driven by a drive motor 6 which provides the rotational movement of each of the spiral mixing arms 4a, 4b 4c and 4d about their own axis, while at the same time rotating the spiral mixing arms 4a, 4b 4c and 4d as a unit about the axis or centreline of the change can 5. The hydraulic lifting system 7 is adapted to position the spiral mixing arms 4a, 4b, 4c and 4d into and remove same out of a change can 5 prior to and after mixing and to support the central drive mechanism 2 and detachable mixing head 3 during mixing.

The hydraulic lifting system 7 and the central drive mechanism 2 are controlled from a control panel 18. The detachable mixing head 3 includes a glass viewing port 20 for enabling visual observation of the contents of change can 5 during a mixing operation. An inlet port 22 is also provided in the detachable mixing head 3 for loading materials into change can 5 when the materials are not dumped into change can 5 directly. Any suitable change can 5 may be utilized, however the example depicted in FIG. 1 is supported on rollers 10 and is fixed in place prior to and during the mixing process by way of lockable arms 11 attached to sides of the can which engage latches 12 adapted to receive and releasably interlock said lockable arms and as such maintain the change can 5 in place during a mixing cycle.

If desired, the spiral mixing arms 4a, 4b 4c and 4d may include non-metallic portions, which will allow a tighter clearance to be obtained between the spiral arms and the wall of change can 5. This enables an improved scraping action with respect to very highly viscous materials such as silicone rubber compositions. Such non-metallic portions of the spiral mixing arms can consist of reinforced TEFLON®, and/or other high temperature (250° C.) resistant materials. The function of the non-metallic portion(s) is to bridge standard clearances of about 5 mm to the wall of the can and thereby avoid a build up of materials around the wall and avoid the temperature build and ensure better mixing. A small non-metallic bottom scraper can also be included on each of the spiral mixing arms typically having a total length not exceeding about 200 mm. In this manner, the whole bottom surface of the can of the change can mixer will be scraped. Alternatively, a separate wall scraper may be added.

The spiral mixing arms, due to their shape, tend to push the mixture being mixed in a downward motion and thereby prevent or at least substantially avoid the lifting and non-mixing of the composition being mixed. The tips are utilized to remove mixture adhered to the mixer wall to ensure good mixing and heat dissipation through the mixer walls.

Central drive mechanism 2 establishes both the planetary movement of the spiral mixing arms as a unit, and the rotation of the individual spiral mixing arms themselves, at a constant ratio of 1:1 to 1:5, preferably a ratio of 1:2.9, most preferably a ratio of 1:1.9. Central drive mechanism 2 preferably includes provision for establishing speed ranges of the planetary movement of 0-100 rpm, more preferably 5-50 rpm. If speeds less than 5 rpm are selected, an external blower for cooling the drive motor is required. The maximum torque of the central drive mechanism in establishing planetary movement is generated at about 5-30 rpm, and at about 30-50 rpm on drive mechanisms, torque reductions coming from the frequency controlled drive.

The mixing action obtained in apparatus used according to the invention is typically a kneading action and a folding behaviour similar to that obtained using Sigma blade mixers and Z-blade mixers, only at a much higher speed, with more mixing arms on an additional planetary motion, which allow a much faster energy incorporation. For example, it has been demonstrated that the temperature build up, and therefore the energy incorporation, is 5-10 times faster than can be obtained using a Sigma blade mixer.

The change can 5 may be transported manually using handle 14 or may be automatically driven into place in some form of conveyor system (not shown). Preferably the change can 5 is perforated at its base with one or more holes. Typically one hole is provided. The change can mixer 1 is adapted to introduce nitrogen into the mixture through the perforations in the base as a means of stripping out volatile by-products and causing mass transfer and as such enhancing the mixing process. In the prior art it is generally known to introduce nitrogen from the top of the mixer but the inventors have found that introduction of nitrogen through the perforation(s) in the base of change can mixer 5 base reduces the necessary stripping time by up to two thirds.

Figure 2:
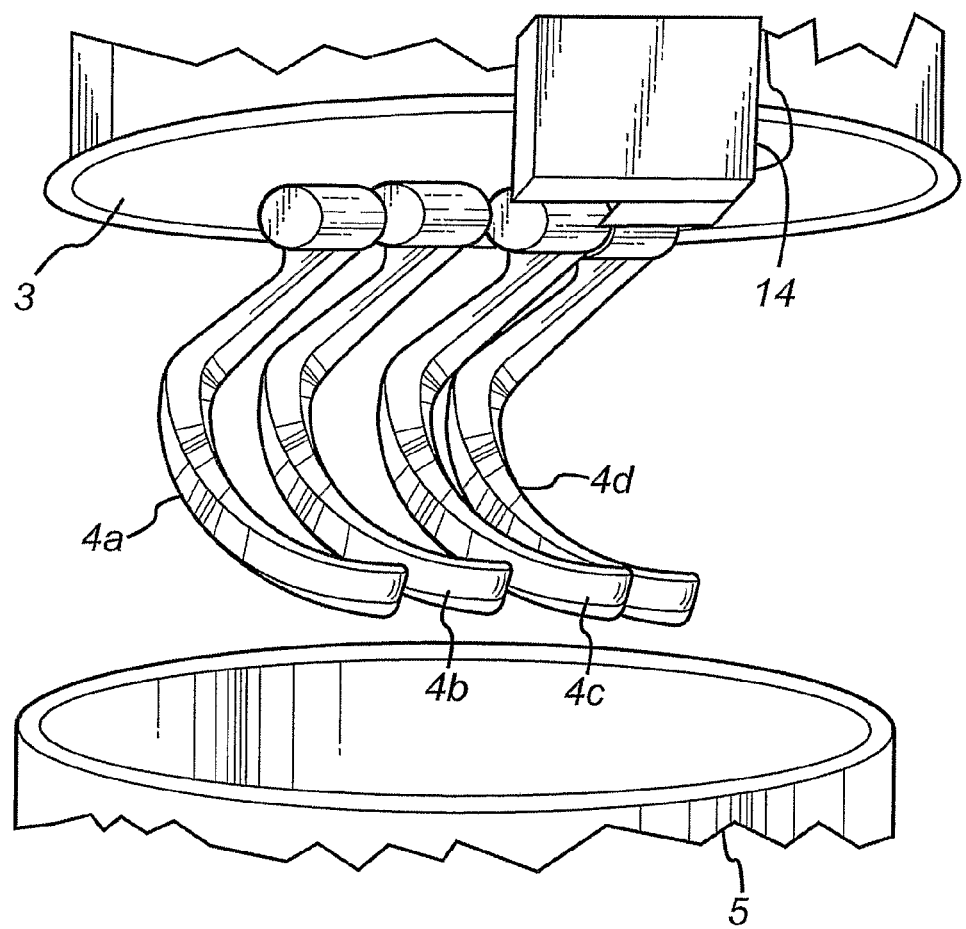
FIG. 2 is a pictorial representation and front view of a portion of the change can mixer in FIG. 1, showing the four spiral mixing arms that rotate and turn in a planetary mode in more detail.

FIG. 2 depicts detachable mixing head 3 and spiral mixing arms 4a-d in greater detail in addition to a further latch means 14 adapted to inter-engage with a change can during mixing. A cross sectional view of a change can with four spiral mixing arms 4a-d is depicted in FIG. 3. In FIG. 3, it can be seen that each spiral mixing arm 4a-d has its own axis about which it is rotated, and change can 5 has an axis or centreline about which the four spiral mixing arms 4a-d are rotated in a planetary mode as one assembly about the axis of change can 5.

Once the mixing step has been completed the resulting mixture may be transferred for additional mixing, de-airing/de-gassing, or any other processes, including for example the introduction of additives such as catalyst (when not introduced in the change can mixing stage), pigments and/or other additives. As an example, there may be provided a multiple station system e.g. a three station system. This conveyor roller system provided for the movement of change can 5 from a first station where change can is filled or partially filled, to a second station where the contents of the change can are mixed, in mixer 1 and then to a third station where the previously mixed contents of change can 5 are processed for dispensing into pails or drums. In the third station any suitable means may be utilized. For example booster pumps may be attached to change can 5 to apply sufficient pressure on the mixed material so that it extrudes out through the perforation(s) in the base of charge can 5 or are used to pump the highly viscous material from charge can 5 into an extruder or other appropriate mixing/additive introducing means, where other additives can be added, and air can be removed from the final product. Alternatively a suitable press, such as a pot press may be utilized.

The means for introducing additives may be any suitable mixer or twin-screw extruder or the like. For example the means for introducing additives may comprise a single screw extruder of the type disclosed in WO 03/024691 comprising
a) an elongate barrel having an inlet for introducing a polymer into the extruder and an outlet for discharging extruded polymer from the barrel
b) a rotatable screw axially disposed within the barrel for advancing polymer in the extruder from the inlet to the outlet
c) one or more additive introduction means for introducing at least one additive at one or more predefined positions along the barrel of the single screw extruder between the inlet and the outlet
wherein
immediately upstream of the or each additive introduction means there is provided, on or around the screw, a plug having a plurality of apertures, said plug being adapted such that, in use, the only way for polymer or polymer/additive mixture to move downstream of the plug is by passing through the apertures and that, having passed through the apertures, the polymer or polymer/additive mixture is subjected to a reduction in pressure and is simultaneously mixed with an additive from the one or more additive introduction means prior to transportation of the resulting polymer additive mixture to the outlet.

Alternatively the means for introducing the additives may be an apparatus for continuously preparing viscous compositions containing additives comprising:
(i) a mixing device for uniformly mixing and dispersing an additive into a viscous fluid;
(iv) one or more servo motor driven pumps for feeding the viscous fluid to the mixing device;
(iii) one or more servo motor driven pumps for feeding the additive to the mixing device;
(iv) means for supplying the viscous fluid to the viscous fluid servo motor driven pumps;
(v) means for supplying the additive to the additive servo motor driven pumps;
(vi) means for dispensing a viscous composition containing the fluid and the additive from the mixing device into a container; (vii) a programmable logic computer, constructed and arranged to control the operation of the servo motor driven pumps for the viscous fluid and the servo motor driven pumps for the additive, so that a predetermined ratio of RPM between the servo motor driven pumps for the viscous fluid and the servo motor driven pumps for the additive, is maintained irrespective of pressure surges in the supply means for the viscous fluid and supply means for the additive; and (viii) a temperature compensation algorithm for compensating fluctuations in temperature of the viscous fluid.

The materials fed to the change can mixer used to make a polymer/filler masterbatch, and the materials which may be introduced into a second change can mixer for finishing the masterbatch may include, for example, the following ingredients:
(i) a polysiloxane having more than at least 20 and preferably 40 siloxane units selected from the group consisting of trialklysilyl end blocked polysiloxanes, and polysiloxanes having at least one silicon bonded alkenyl, hydroxyl, or hydrolysable group;
(ii) a suitable filler material, preferably comprising a reinforcing filler comprising one or more of finely divided silica, calcium carbonate, quartz powder, aluminium hydroxide, zirconium silicate, diatomaceous earth, and titanium dioxide;
(iii) an hydrophobing agent selected from the group consisting of disilazanes and polydiorganosiloxanes having 2-40 siloxane units having silicon bonded hydroxyl or amino groups; and optionally
(iv) water, and/or
(v) the product formed by mixing any two or more of (i) to (iv).

The polysiloxanes used in the process according to the invention may be linear or branched, and have a viscosity varying from a fluid to a gum. These materials comprise siloxane chain units of the formula $X_p R_q SiO_{4-(p+q)/2}$ and chain terminating units of the formula $XR_2 SiO_{1/2}$, in which each R represents a monovalent hydrocarbon group containing 1-12 carbon atoms such as methyl or phenyl which may be substituted or unsubstituted; X represents R, an alkenyl group, a hydroxyl group, or a hydrolysable group; p has a value of 0, 1, or 2; q has a value of 0, 1, or 2; and the sum of p+q has a value of 0, 1, or 2. Preferred polysiloxanes (a) are at least substantially linear materials consisting predominantly of chain units of the formula $R_2 SiO$— where R represents the methyl group. Suitable materials include trimethylsilyl terminated polydimethylsiloxanes having a viscosity of 350 mPa·s or more; methylvinylpolysiloxanes having a viscosity of 2,000 to 60,000 mPa·s; α-ω-dihydroxypolydiorganosiloxanes having a viscosity of 5,000 to 11,000 mPa·s; and fluorinated polydiorganosiloxanes.

The filler may be any suitable filler or combination of fillers but preferably comprises at least one reinforcing filler. The reinforcing filler may be any filler normally employed in silicone compositions such as high surface area silicas or calcium carbonates; quartz powder; aluminium hydroxide; zirconium silicate; diatomaceous earth; and titanium dioxide. If desired, the reinforcing filler fed to the change can mixer may consist in whole or in part of surface treated silica or calcium carbonate, such as silica which has been rendered hydrophobic by treatment of its surface with a silane, siloxane, or a silazane.

When a reinforcing filler is used which has not been surface treated to render it hydrophobic, it is preferred to additionally feed a hydrophobing agent to the change can mixer. Preferably, the hydrophobing agent is one or more agents selected from the group consisting of disilazanes with water, and polydiorganosiloxanes with 2-40 siloxane units, preferably having silicon bonded hydroxyl or amino groups. Suitable disilazanes include compositions such as hexamethyldisilazane (HMDZ), i.e. $(CH_3)_3SiNHSi(CH_3)_3$ and tetramethyldivinyldisilazane, i.e. $H_2C=CH—(CH_3)_2SiNHSi(CH_3)_2—CH=CH_2$. The polydiorganosiloxanes are preferably linear polydiorganosiloxanes having relatively short chains such as hexamethyldisiloxane (HMDO), i.e. $(CH_3)_3SiOSi(CH_3)_3$. Some examples of short chain silicone diols that can be used include compositions having the formula $HO(SiCH_3O)_nH$, where n typically has a value of 3-8, generally averaging about 3-4. Short chain silicone diols cannot be accurately defined, however, since they are present as mixtures containing of a number of different silicone diols.

The process according to the invention is useful for processing filler containing polysiloxane masses generally, and can be used for the preparation of master batches that are intended for further processing to provide formulations in which one or more parts for curing are used to provide the finished product. In this regard, the process for making master batches suitable for processing into a curable product may consist of feeding the materials to the change can mixer where they are mixed and conveyed to a dispensing system including an extruder for the removing gaseous materials before the end product is loaded into drums and/or pails.

The materials obtained from the outlet of the change can mixer may be further compounded with other additives, including, for example, curative agents, catalysts, inhibitors, plasticizers, extenders, and non-reinforcing fillers. Curatives that may be used include, for example, polysiloxanes incorporating silicon-bonded hydrogen atoms for reaction with the alkenylpolysiloxanes present in the master batch, and hydrolysable silanes or siloxanes for reaction with the polysiloxanes of the master batch having hydroxyl groups or hydrolysable groups.

Catalysts that may be used include, for example, hydrosilylation catalysts (in conjunction with a suitable cross-linker selected from a platinum, rhodium, iridium, palladium or ruthenium catalyst. Any suitable hydrosilylation catalyst may be utilized including for example, platinum catalysts such as a fine platinum powder, platinum black, chloroplatinic acid, alcohol-modified chloroplatinic acid, a complex of an olefin and a chloroplatinic acid, a complex of a chloroplatinic acid and an alkenyl siloxane, or a thermoplastic resin powder that contains the aforementioned platinum catalysts, coordination complexes of chloroplatinic acid and vinylsiloxanes, tetrakis (triphenylphosphine)palladium, or mixtures of palladium black, triphenylphosphine, and rhodium; rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R)_2S]_3$, $(R^2_3P)_2Rh(CO)X$, $(R^2_3P)_2Rh(CO)H$, $Rh_2X_2Y_4$, $H_aRh_b\text{olefin}_cCl_d$, $Rh(O(CO)R)_{3-n}(OH)_n$ where X is hydrogen, chlorine, bromine or iodine, Y is an alkyl group, such as methyl or ethyl, CO, $C_8H_{14}$ or 0.5 $C_8H_{12}$, R is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any Iridium catalysts such as $Ir(OOCCH_3)_3$, $Ir(C_5H_7O_2)_3$, $[Ir(Z)(En)_2]_2$, or $(Ir(Z)(Dien)]_2$, where Z is chlorine, bromine, iodine, or alkoxy, En is an olefin and Dien is cyclooctadiene may also be used.

Other catalysts include organometallic salts or complexes for promoting a condensation cure, such as titanate and/or zirconate based complexes, tin complexes such as dibutyl-tin-dilaurate and peroxides.

A Platinum group catalyst that is effective for the addition of silicon bonded hydrogen to silicon bonded alkenyl groups is particularly preferred. In the case where the catalyst is a hydrosilylation catalyst a cross-linker also needs to be present. The cross-linker utilized is a polysiloxane containing at least two silicon-bonded hydrogen atoms per molecule. It may be a linear, cyclic, or branched polysiloxane containing primarily monofunctional and difunctional units, but it may contain other types of units such as trifunctional and tetrafunctional units. Preferred are linear homopolymers or copolymers having a DP of from 500 to 2,000. Other groups which can be present include monovalent unsubstituted hydrocarbon groups such as methyl, ethyl, n-propyl, octyl, cyclohexyl and phenyl; and monovalent substituted hydrocarbon group such as tolyl, xylyl, benzyl, p-chlorophenyl or cyanoethyl. With the exception of the hydrogen atoms present, the groups are preferably methyl.

In the case of tin catalysts crosslinkers such as tetraalkylsilane, phenyltrialkylsilane and tetraalkylorthosilicate may be used. Preferably the alkyl group is a methyl or ethyl group.

Peroxide catalysts do not generally require a cross-linker. They generally comprise organic peroxides which are capable of generating free radicals when heated to form cross links by reacting with the methyl and vinyl groups on the linear high molecular weight silicone polymer. Some commonly used organic peroxides are the non-vinyl specific organic peroxides such as benzoyl peroxide, 1,4-dichlorobenzoyl peroxide, 2,4-dichlorobenzoyl peroxide, di-t-butyl peroxide, dicumyl peroxide, tertiary butyl-perbenzoate, and monochlorobenzoyl peroxide; and the vinyl specific organic peroxides such as ditertiary-butyl peroxide, 2,5-bis-(tertiary-butyl-peroxy)-2,5-dimethylhexane, tertiary-butyl-trimethyl peroxide, tertiary-butyl-tertiary-butyl-tertiary-triphenyl peroxide, and t-butyl perbenzoate.

Inhibitors may be incorporated to vary the rate of reaction in the cured product these are particularly important for platinum based curing systems and may include benzotriazole, 2-ethynylisopropanol, and dimethyl sulphoxide. Plasticizers and extenders that may be incorporated include, for example, trimethylsilyl terminated polydimethylsiloxanes. Non-reinforcing fillers that may be incorporated include, for example, quartz (crystalline $SiO_2$), iron oxide; zinc oxide; carbon black; glass micro-balloons; and carbonates of calcium, magnesium, barium, or zinc; and barium sulphate.

According to the present process, benefit is taken of a particular change can mixer having a planetary drive and containing two or more spirally shaped mixing arms. The uniqueness of the invention resides in the use of this type of mixing device for manufacturing silicone rubber compositions. Each spiral mixing arm acts as a scraper, pushing products downwardly, whereas highly viscous materials tend to always move upwardly in other types of batch mixing devices.

If desired, the spiral mixing arms may include non-metallic portions, which will allow a tighter clearance to be obtained between the spiral arms and the wall of the change can mixer. This enables an improved scraping action with respect to very highly viscous materials such as silicone rubber compositions. Such non-metallic portions of the spiral mixing arms can consist of reinforced TEFLON®, and/or other high temperature (250° C.) resistant materials. The function of the non-metallic portion(s) is to bridge standard clearances of about 5 mm to the wall of the can and thereby avoid a build up of materials around the wall and avoid the temperature build and ensure better mixing. A small non-metallic bottom scraper can also be included on each of the spiral mixing arms typically having a total length not exceeding about 200 mm. In this manner, the whole bottom surface of the can of the change can mixer will be scraped.

The incorporation of very light fillers such as silica, which typically tends to float on the surface, can be achieved very rapidly in this invention due to the highly generated turbulences and surface exchanges provided by the change can mixer. While the speed of other mixers is generally reduced in order to obtain an efficient incorporation of the filler into the polysiloxane, and at the same time avoid the entrapment of air, the maintenance of high speeds during filler incorporation in the change can mixer of the invention, had no deleterious effect.

EXAMPLES

The following examples are set forth in order to illustrate the invention in more detail.

Example 1

60-70 parts by weight of (a) a vinyl functional polydiorganosiloxane having a viscosity of 55,000 mPa·s were mixed with (b) 9 parts by weight of hexamethyldisilazane, (c) 2 parts by weight of water, and (d) 0.3 parts by weight of hexamethyldivinyldisilazane, for 1-5 minutes in a change can mixer of the general design as shown in FIGS. 1-3. The planetary change can mixer had three spiral mixing arms, which interacted with each other in order to form a homogeneous mixture. 45-50 parts by weight of a fumed silica having a surface area of 380 $m^2/g$ was transferred into the change can mixer and incorporated into the homogeneous mixture. During this phase, the central drive mechanism was controlled so as to provide a speed of 30-40 rpm on the planetary movement of the spiral mixing arms, while at the same time, the three spiral mixing arms turned at a faster ratio of 2. This phase of incorporation took less than 10 minutes, while at the same time maintaining a temperature of less than about 70° C. The mixture was heated up by the natural mixing friction produced in the change can mixer to a temperature of 210-230° C., and exposed to a reduced pressure of −950 mbar (−9.5× $10^4$ Pa) in order to remove water, hexamethyldisilazane, trimethylsilanol HO—Si—$(CH_3)_3$, and any other by-products. This phase took about 30-40 minutes. An additional 30-40 parts by weight of the vinyl functional polydiorganosiloxane (a) were added at a feed rate of 8-10 parts/minute, to form a homogeneous paste. A determination was made that the paste was suitable for formulating into a curable composition. The paste was cooled at a lower planetary mixing speed of 10 rpm to a temperature less than 110° C. The paste was then removed from the change can and extruded. The maximum batch cycle time for a 15 kg batch was 90 minutes. This was compared to cycle times of 220-260 minutes known to exist on other standard mixers. The viscosity of the paste was measured 24 hours after its manufacture using a cone and plate viscometer at a 10 s$^{-1}$ shear rate, and determined to be 1,000 Pa·s. The paste had an aging behaviour of 25 percent after 100 hours at 75° C.

Example 2

Example 1 was repeated except that 60-65 parts by weight of (a) a vinyl functional polydiorganosiloxane having a viscosity of 2100 mPa·s were mixed with (b) 8 parts by weight of hexamethyldisilazane, and (c) 2.5 parts by weight of water, for 1-3 minutes in the change can mixer. 50-55 parts by weight of a fumed silica having a surface area of 255 m$^2$/g were transferred into the change can mixer and incorporated into the homogeneous mixture. This phase of incorporation took less than 15 minutes. The mixture was heated up by the natural mixing friction produced in the change can mixer to a temperature of 180-200° C. After the removal of water, hexamethyldisilazane, trimethylsilanol, and any other by-products, an additional 35-40 parts by weight of the vinyl functional polydiorganosiloxane (a) were added at a feed rate of 6-10 parts/minute, to form a homogeneous paste. The maximum batch cycle time for a 15 kg batch was 90 minutes. This was compared to cycle times of 200-210 minutes known to exist on other standard mixers. The viscosity of the paste was 700 Pa·s, and it had an aging behaviour of 30 percent after 100 hours at 75° C.

Example 3

Example 2 was repeated except that 55-60 parts by weight of (a) a vinyl functional polydiorganosiloxane having a viscosity of 450 mPa·s were mixed with (b) 8 parts by weight of hexamethyldisilazane, and (c) 2.1 parts by weight of water, in the change can mixer. The fumed silica had a surface area of 380 m$^2$/g. After the removal of water, hexamethyldisilazane, trimethylsilanol, and any other by-products, an additional 40-45 parts by weight of the vinyl functional polydiorganosiloxane (a) were added at a feed rate of 5-10 parts/minute, to form the homogeneous paste. The maximum batch cycle time for a 15 kg batch was 80 minutes. This was compared to cycle times of 210-230 minutes known to exist on other standard mixers. The viscosity of the paste was 600 Pa·s, and it had an aging behaviour of 20 percent after 100 hours at 75° C.

Example 4

Example 3 was repeated except that 45-50 parts by weight of (a) a vinyl functional polydiorganosiloxane having a viscosity of 55000 mPa·s were mixed with (b) 10 parts by weight of hexamethyldisilazane, and (c) 4 parts by weight of water, in the change can mixer. The fumed silica had a surface area of 190 m$^2$/g. The natural mixing friction in the change can mixer heated the mixture to 190-210° C. during its incorporation, and it took about 50-60 minutes. After removal of water, hexamethyldisilazane, trimethylsilanol, and any other by-products, an additional 50-55 parts by weight of the vinyl functional polydiorganosiloxane (a) were added at a feed rate of 8-10 parts/minute, to form the homogeneous paste. The maximum batch cycle time for a 15 kg batch was 120 minutes. This was compared to cycle times of 380-420 minutes known to exist on other standard mixers. The viscosity of the paste was 1,400 Pa·s, and it had an aging behaviour of 35 percent after 100 hours at 75° C.

Example 5

Example 4 was repeated except that 40-45 parts by weight of (a) a vinyl functional polydiorganosiloxane having a viscosity of 2100 mPa·s were mixed with (b) 6.5 parts by weight of hexamethyldisilazane, and (c) 2 parts by weight of water, in the change can mixer. After removal of water, hexamethyldisilazane, trimethylsilanol, and any other by-products, an additional 55-60 parts by weight of the vinyl functional polydiorganosiloxane (a) were added at a feed rate of 6-10 parts/minute, to form the homogeneous paste. The viscosity of the paste was 1,100 Pa·s.

Example 6

In this Example, viscosity is expressed in terms of Plasticity since very high viscosities cannot practically be expressed in terms of Poise. Plasticity is a number obtained by means of a Penetration Test, in which penetration of a highly viscous material is made with a weight that penetrates into the highly viscous material. The depth of penetration of the weight is recorded and used as the measurement of viscosity, but it is expressed in terms of a Plasticity number. The number refers to the millimeters of deformation/penetration of the weight into the highly viscous material. The short chain silicone diol used in this Example was a mixture of silicone diols of the formula HO(SiCH$_3$O)$_n$H where n averaged 3-4.

100 parts by weight of (i) a vinyl functional polydiorganosiloxane gum having a plasticity of 1.6 were mixed with 7-9 parts by weight of the short chain silicone diol, for 3-5 minutes in the change can planetary mixer shown in FIGS. 1-3. The detachable mixing head, as shown in FIG. 3, housed 4 spiral mixing arms, which interacted with each other to form a homogeneous mixture. 50-55 parts by weight of a precipitated silica having a surface area of 190 m$^2$/g were transferred into the change can of the mixer, and incorporated into the homogeneous mixture. During this phase, the central drive mechanism was controlled so as to provide a speed of 20-30 rpm on the planetary movement of the four spiral mixing arms as an assembly, while at the same time, the four spiral mixing arms turned about their axis at a faster ratio of 2. This phase of incorporation took less than 10 minutes, while at the same time, maintaining a temperature of less than about 100° C. The mixture was heated up the natural mixing friction produced in the change can mixer to a temperature of 160-170° C., and maintained at that temperature for 15 minutes under a slow mixing action. During the last 5 minutes, it was exposed to a reduced pressure of −800 mbar (−8×10$^4$ Pa) in order to remove any dissolved air. The obtained paste was cooled at a lower planetary mixing speed of one rpm to a temperature of less than 110° C. The paste was then removed from the change can and extruded. The maximum batch cycle time for a 15 kg batch was 60 minutes. This was compared to cycle times of 120-150 minutes known to exist on standard mixers. Its plasticity was measured 24 hours after its manufacture and found to be 2.8.

Other variations may be made in compounds, compositions, and methods described herein without departing from the essential features of the invention. The embodiments of the invention specifically illustrated herein are exemplary only and not intended as limitations on their scope except as defined in the appended claims.

The invention is claimed is:

1. A process for the production of a polysiloxane containing mass incorporating surface treated filler materials comprising feeding materials to a change can mixer in which the materials are mixed; the change can mixer comprising a detachable mixing head assembly containing at least two spiral mixing arms extending downwardly into a can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, the materials being mixed to form a mixture in the change can mixer comprising:
  (i) a polysiloxane having more than 40 siloxane units, which is selected from the group consisting of trialklysilyl end blocked polysiloxanes, and polysiloxanes having at least one silicon bonded alkenyl group, hydroxyl group, and hydrolysable group;
  (ii) a reinforcing filler material selected from the group consisting of finely divided silica, surface treated finely divided silica, calcium carbonate, surface treated finely divided calcium carbonate, quartz powder, aluminium hydroxide, zirconium silicate, diatomaceous earth, and titanium dioxide; and
  (iii) an hydrophobing agent selected from the group consisting of disilazanes and polydiorganosiloxanes having 2-40 siloxane units having silicon bonded hydroxyl groups or amino groups;
  with the proviso that each of the materials (i)-(iii) are fed into the change can mixer as the material itself, or as a mixture containing one or more of materials (i)-(iii); and
  wherein the change can comprises one or more perforations therein.

2. A process in accordance with claim 1 wherein a resulting mixture is stripped by passing an inert gas through the perforation(s) into the mixture during and/or after the mixing process.

3. A process in accordance with claim 1 wherein, subsequent to mixing, a resulting mixture is extruded through the perforation(s) by means of a suitable press.

4. A process in accordance with claim 3 wherein the press is a pot press.

5. A process in accordance with claim 1 wherein after mixing, the mixture is conveyed to a de-airing unit for the removal of gaseous materials from the mixture.

6. A process in accordance with claim 1 wherein after mixing, the resulting mixture is conveyed into and through a means for introducing additives into the mixture.

7. A process in accordance with claim 6 wherein the means for introducing additives into the mixture is a twin screw extruder or a single screw extruder.

8. A process in accordance with claim 6 wherein the means for introducing additives into the mixture is an apparatus for continuously preparing viscous compositions containing additives comprising:
  (i) a mixing device for uniformly mixing and dispersing an additive into a viscous fluid;
  (ii) one or more servo motor driven pumps for feeding the viscous fluid to the mixing device;
  (iii) one or more servo motor driven pumps for feeding the additive to the mixing device;
  (iv) means for supplying the viscous fluid to the viscous fluid servo motor driven pumps;
  (v) means for supplying the additive to the additive servo motor driven pumps;
  (vi) means for dispensing a viscous composition containing the fluid and the additive from the mixing device into a container;
  (vii) a programmable logic computer, constructed and arranged to control the operation of the servo motor driven pumps for the viscous fluid and the servo motor driven pumps for the additive, so that a predetermined ratio of RPM between the servo motor driven pumps for the viscous fluid and the servo motor driven pumps for the additive, is maintained irrespective of pressure surges in the supply means for the viscous fluid and supply means for the additive; and
  (viii) a temperature compensation algorithm for compensating fluctuations in temperature of the viscous fluid.

9. A process according to claim 1 in which the finely divided filler comprises fumed silica or precipitated silica.

10. A process according to claim 1 in which the mixture is in the form of a paste or a powder.

11. A process according to claim 1 in which the materials being mixed to form the mixture in the change can mixer include water.

12. A process according to claim 1 in which the mixture is further compounded with one or more other materials comprising curative agents, catalysts, inhibitors, plasticising agents, extending agents, and non-reinforcing fillers, to provide a curable product.

13. A process according to claim 1 in which the change can mixer contains 2-5 spiral mixing arms extending downwardly into the can of the change can mixer.

14. A process according to claim 13 in which the change can mixer contains three spiral mixing arms spaced 120 degrees apart circumferentially with respect to the centre line of the can of the change can mixer.

15. A process according to claim 1 in which the spiral mixing arms carry a non metallic edge to avoid build up of material on the pot walls.

16. A process in accordance with claim 2 wherein, subsequent to mixing, a resulting mixture is extruded through the perforation(s) by means of a suitable press.

17. A process in accordance with claim 7 wherein the means for introducing additives into the mixture comprises a single screw extruder comprising:
  a) an elongate barrel having an inlet for introducing a polymer into the extruder and an outlet for discharging extruded polymer from the barrel;
  b) a rotatable screw axially disposed within the barrel for advancing polymer in the extruder from the inlet to the outlet; and
  c) one or more additive introduction means for introducing at least one additive at one or more predefined positions along the barrel of the single screw extruder between the inlet and the outlet,
  wherein immediately upstream of the additive introduction means there is provided, on or around the screw, a plug having a plurality of apertures, the plug being adapted such that, in use, the only way for polymer or polymer/additive mixture to move downstream of the plug is by passing through the apertures and that, having passed through the apertures, the polymer or polymer/additive mixture is subjected to a reduction in pressure and is simultaneously mixed with an additive from the one or more additive introduction means prior to transportation of the resulting polymer additive mixture to the outlet.

18. A process for the production of a polysiloxane containing mass incorporating surface treated filler materials comprising feeding materials to a change can mixer in which the materials are mixed; the change can mixer comprising a detachable mixing head assembly containing at least two spiral mixing arms extending downwardly into a can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, the materials being mixed to form a mixture in the change can mixer comprising:
(i) a polysiloxane having more than 40 siloxane units, which is selected from the group consisting of trialklysilyl end blocked polysiloxanes, and polysiloxanes having at least one silicon bonded alkenyl group, hydroxyl group, and hydrolysable group;
(ii) a reinforcing filler material selected from the group consisting of finely divided silica, surface treated finely divided silica, calcium carbonate, surface treated finely divided calcium carbonate, quartz powder, aluminium hydroxide, zirconium silicate, diatomaceous earth, and titanium dioxide; and
(iii) an hydrophobing agent selected from the group consisting of disilazanes and polydiorganosiloxanes having 2-40 siloxane units having silicon bonded hydroxyl groups or amino groups;

with the proviso that each of the materials (i)-(iii) are fed into the change can mixer as the material itself, or as a mixture containing one or more of materials (i)-(iii); and wherein after mixing the mixture is conveyed to a de-airing unit for the removal of gaseous materials from the mixture.

19. A process in accordance with claim 18 wherein after mixing the resulting mixture is conveyed into and through a means for introducing additives into the mixture.

20. A process in accordance with claim 19 wherein the means for introducing additives into the mixture is a twin screw extruder, a single screw extruder, or an apparatus for continuously preparing viscous compositions containing additives.

21. A process according to claim 18 in which the finely divided filler comprises fumed silica or precipitated silica.

22. A process according to claim 18 in which the mixture is in the form of a paste or a powder.

23. A process according to claim 18 in which the mixture is further compounded with one or more other materials comprising curative agents, catalysts, inhibitors, plasticising agents, extending agents, and non-reinforcing fillers, to provide a curable product.

24. A process according to claim 18 in which the change can mixer contains 2-5 spiral mixing arms extending downwardly into the can of the change can mixer.

25. A process according to claim 24 in which the change can mixer contains three spiral mixing arms spaced 120 degrees apart circumferentially with respect to the centre line of the can of the change can mixer.

26. A process according to claim 18 in which the spiral mixing arms carry a non metallic edge to avoid build up of material on the pot walls.

27. A process for the production of a polysiloxane containing mass incorporating surface treated filler materials comprising feeding materials to a change can mixer in which the materials are mixed; the change can mixer comprising a detachable mixing head assembly containing at least two spiral mixing arms extending downwardly into a can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, the materials being mixed to form a mixture in the change can mixer comprising:
(i) a polysiloxane having more than 40 siloxane units, which is selected from the group consisting of trialklysilyl end blocked polysiloxanes, and polysiloxanes having at least one silicon bonded alkenyl group, hydroxyl group, and hydrolysable group;
(ii) a reinforcing filler material selected from the group consisting of finely divided silica, surface treated finely divided silica, calcium carbonate, surface treated finely divided calcium carbonate, quartz powder, aluminium hydroxide, zirconium silicate, diatomaceous earth, and titanium dioxide; and
(iii) an hydrophobing agent selected from the group consisting of disilazanes and polydiorganosiloxanes having 2-40 siloxane units having silicon bonded hydroxyl groups or amino groups;

with the proviso that each of the materials (i)-(iii) are fed into the change can mixer as the material itself, or as a mixture containing one or more of materials (i)-(iii); and wherein after mixing, the resulting mixture is conveyed into and through a means for introducing additives into the mixture.

28. A process in accordance with claim 27 wherein the means for introducing additives into the mixture is a twin screw extruder or a single screw extruder.

29. A process in accordance with claim 28 wherein the means for introducing additives into the mixture comprises a single screw extruder comprising:
a) an elongate barrel having an inlet for introducing a polymer into the extruder and an outlet for discharging extruded polymer from the barrel;
b) a rotatable screw axially disposed within the barrel for advancing polymer in the extruder from the inlet to the outlet; and
c) one or more additive introduction means for introducing at least one additive at one or more predefined positions along the barrel of the single screw extruder between the inlet and the outlet,
wherein immediately upstream of the additive introduction means there is provided, on or around the screw, a plug having a plurality of apertures, the plug being adapted such that, in use, the only way for polymer or polymer/additive mixture to move downstream of the plug is by passing through the apertures and that, having passed through the apertures, the polymer or polymer/additive mixture is subjected to a reduction in pressure and is simultaneously mixed with an additive from the one or more additive introduction means prior to transportation of the resulting polymer additive mixture to the outlet.

30. A process in accordance with claim 27 wherein the means for introducing additives into the mixture is an apparatus for continuously preparing viscous compositions containing additives comprising:
(i) a mixing device for uniformly mixing and dispersing an additive into a viscous fluid;
(ii) one or more servo motor driven pumps for feeding the viscous fluid to the mixing device;
(iii) one or more servo motor driven pumps for feeding the additive to the mixing device;
(iv) means for supplying the viscous fluid to the viscous fluid servo motor driven pumps;
(v) means for supplying the additive to the additive servo motor driven pumps;
(vi) means for dispensing a viscous composition containing the fluid and the additive from the mixing device into a container;
(vii) a programmable logic computer, constructed and arranged to control the operation of the servo motor driven pumps for the viscous fluid and the servo motor driven pumps for the additive, so that a predetermined ratio of RPM between the servo motor driven pumps for the viscous fluid and the servo motor driven pumps for the additive, is maintained irrespective of pressure surges in the supply means for the viscous fluid and supply means for the additive; and (viii) a temperature compensation algorithm for compensating fluctuations in temperature of the viscous fluid.

31. A process for the production of a polysiloxane containing mass incorporating surface treated filler materials comprising feeding materials to a change can mixer in which the materials are mixed; the change can mixer comprising a detachable mixing head assembly containing at least two spiral mixing arms extending downwardly into a can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, the materials being mixed to form a mixture in the change can mixer comprising:

(i) a polysiloxane having more than 40 siloxane units, which is selected from the group consisting of trialklysilyl end blocked polysiloxanes, and polysiloxanes having at least one silicon bonded alkenyl group, hydroxyl group, and hydrolysable group;

(ii) a reinforcing filler material selected from the group consisting of finely divided silica, surface treated finely divided silica, calcium carbonate, surface treated finely divided calcium carbonate, quartz powder, aluminium hydroxide, zirconium silicate, diatomaceous earth, and titanium dioxide; and (iii) an hydrophobing agent selected from the group consisting of disilazanes and polydiorganosiloxanes having 2-40 siloxane units having silicon bonded hydroxyl groups or amino groups;

with the proviso that each of the materials (i)-(iii) are fed into the change can mixer as the material itself, or as a mixture containing one or more of materials (i)-(iii); and wherein the materials being mixed to form the mixture in the change can mixer include water.

32. A process for the production of a polysiloxane containing mass incorporating surface treated filler materials comprising feeding materials to a change can mixer in which the materials are mixed; the change can mixer comprising a detachable mixing head assembly containing at least two spiral mixing arms extending downwardly into a can of the change can mixer, drive means for rotating the spiral mixing arms around their own axis, and drive means for rotating the spiral mixing arms as a unit around the axis of the can and wherein the geometry of the mixing arms is such that they generate downwardly directing motion on the composition being mixed, the materials being mixed to form a mixture in the change can mixer comprising:

(i) a polysiloxane having more than 40 siloxane units, which is selected from the group consisting of trialklysilyl end blocked polysiloxanes, and polysiloxanes having at least one silicon bonded alkenyl group, hydroxyl group, and hydrolysable group;

(ii) a reinforcing filler material selected from the group consisting of finely divided silica, surface treated finely divided silica, calcium carbonate, surface treated finely divided calcium carbonate, quartz powder, aluminium hydroxide, zirconium silicate, diatomaceous earth, and titanium dioxide; and (iii) an hydrophobing agent selected from the group consisting of disilazanes and polydiorganosiloxanes having 2-40 siloxane units having silicon bonded hydroxyl groups or amino groups;

with the proviso that each of the materials (i)-(iii) are fed into the change can mixer as the material itself, or as a mixture containing one or more of materials (i)-(iii); and wherein the spiral mixing arms carry a non metallic edge to avoid build up of material on the pot walls.

33. A process in accordance with claim 32 wherein after mixing, the resulting mixture is conveyed into and through a means for introducing additives into the mixture.

34. A process in accordance with claim 33 wherein the means for introducing additives into the mixture is a twin screw extruder, a single screw extruder, or an apparatus for continuously preparing viscous compositions containing additives.

35. A process according to claim 32 in which the finely divided filler comprises fumed silica or precipitated silica.

36. A process according to claim 32 in which the mixture is in the form of a paste or a powder.

37. A process according to claim 32 in which the mixture is further compounded with one or more other materials comprising curative agents, catalysts, inhibitors, plasticising agents, extending agents, and non-reinforcing fillers, to provide a curable product.

38. A process according to claim 32 in which the change can mixer contains 2-5 spiral mixing arms extending downwardly into the can of the change can mixer.

39. A process according to claim 38 in which the change can mixer contains three spiral mixing arms spaced 120 degrees apart circumferentially with respect to the centre line of the can of the change can mixer.

* * * * *